INVENTORS
LLOYD A. BUCKMINSTER
ROBERT R. HINES
BY
ATTORNEY

Feb. 13, 1968   L. A. BUCKMINSTER ET AL   3,368,285
LENS MARKING DEVICE

Filed Nov. 22, 1965   4 Sheets-Sheet 3

INVENTORS
LLOYD A. BUCKMINSTER
ROBERT R. HINES
BY
*B.E. Shlesinger*
ATTORNEY

Feb. 13, 1968    L. A. BUCKMINSTER ET AL    3,368,285
LENS MARKING DEVICE
Filed Nov. 22, 1965    4 Sheets-Sheet 4

INVENTORS
LLOYD A. BUCKMINSTER
ROBERT R. HINES
BY
ATTORNEY

United States Patent Office 3,368,285
Patented Feb. 13, 1968

3,368,285
LENS MARKING DEVICE
Lloyd A. Buckminster, Geneva, and Robert R. Hines, Phelps, N.Y., assignors to Textron, Inc., Rochester, N.Y., a corporation of Rhode Island
Filed Nov. 22, 1965, Ser. No. 508,940
7 Claims. (Cl. 33—174)

ABSTRACT OF THE DISCLOSURE

The apparatus has a reticle with two sets of graduations. A straight line inscribed on a slide is adjusted against one set to the desired offset of the reading segment in the lens. A pivotally mounted cord reads against other graduations, giving prescribed position of top edge of segment. Two strips, adjustable against first graduations, are set to desired width of segment. Lens blank is placed on top of reticle. Images of blank, straight line, cord, and strips are projected on a screen disposed above blank, and blank is adjusted to correct segment position. Marker, previously adjusted for desired cylindrical axis, is then used to mark blank.

---

The present invention relates to lens marking devices, and more particularly to apparatus for locating and marking the reading segments, axis, and optical centers of bifocal lens blanks according to prescription requirements, and either in semi-finished form for surfacing, or in the uncut form in preparation for edging.

There are a number of lens marking devices on the market. Clear visibility of the bifocal segment is of paramount importance for accurate layout of bifocal blanks for surfacing. In some cases the light intensity in the marking devices is too weak for properly locating the lenses for marking. In some cases there are too many lines on the target, against which the lens has to be registered; and this causes confusion in trying to locate the lens for marking. In some cases the lines are not sharp enough on the target. In some cases the layout and marking devices have been constructed with pinholes, which means that the operator has to position his eye exactly over the pinhole to align the lens properly, otherwise errors due to parallax will occur. Such sighting devices, moreover, cause fatigue and lost time.

Some of these prior devices use steel marking points. Such marking points, however, may damage the lens surface. Moreover, the marking fluid has a tendency to build up on the point and does not produce a good working line. In some cases the lens itself has to be adjusted in the device before it can be marked.

One object of the present invention is to provide a lens marker for marking a lens for both surfacing and finishing operations in which the settings are simplified, and which is easy to operate.

Another object of the invention is to provide an intsrument of the character described which is of increased accuracy. To this end another object of the invention is to provide a device of the character described in which a clear, unobstructed view of the lens body of the reading segment of the lens, and of the members used in aligning the segment, is provided during the whole aligning procedure.

Another object of the invention is to provide a lens marker of the character described in which the stamp for marking the lens is readily accessible for cleaning and replacement.

Another object of the invention is to provide a lens marker which can be adjusted to the required settings before the lens is placed in position on the marker.

Another object of the invention is to provide a lens marker having sufficient light intensity for viewing and locating any lens that can be handled by the marker.

A further object of the invention is to provide a marker which can be used for marking lenses for either surfacing or finishing.

Other objects of the invention will be apparent hereinafter from the specification and from the recital of the appended claims particularly when read in conjunction with the accompanying drawings.

Figure 3:
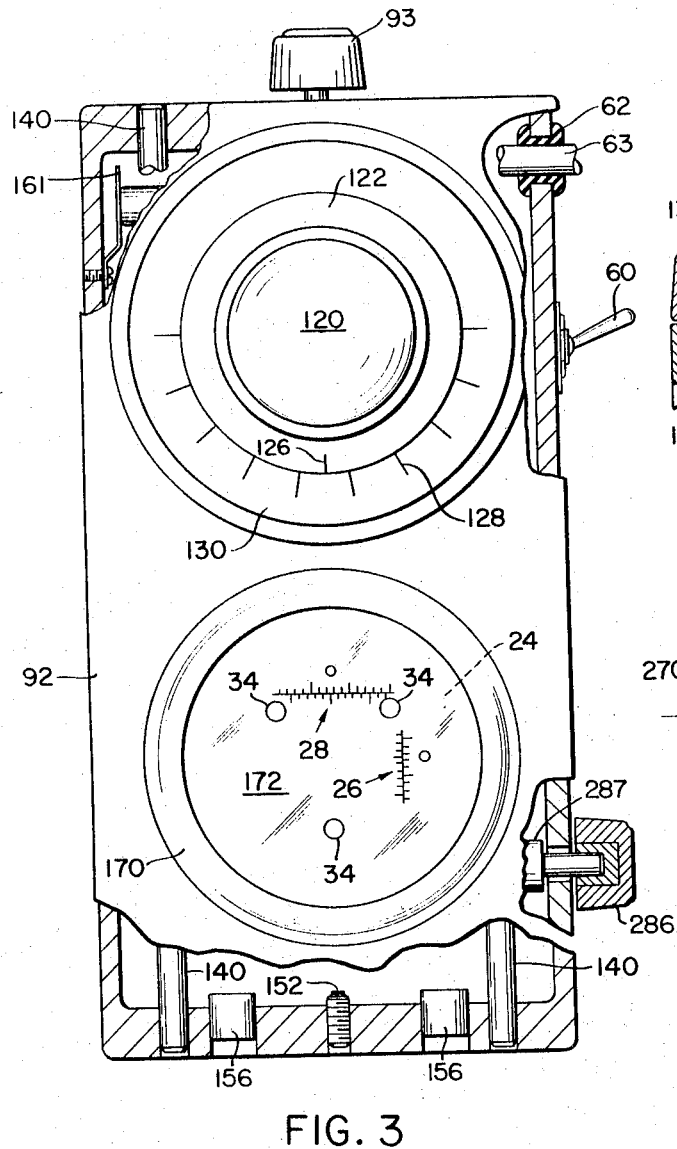
FIG. 3 is a plan view, with parts broken away, of this marker.

Referring now to the drawings by numerals of reference, 20 denotes the base of the machine. The base is hollow and has a circular opening 22 (FIG. 1) at its top adjacent one end. Mounted above this opening and on top of the base is a circular transparent sheet of glass or plastic 24, which constitutes a reticle plate and on which are engraved two sets of graduations 26 and 28, which extend at right angles to one another as shown in FIG. 3. The plate 24 is secured to the base by a ring 30 that has an internally projecting annular flange which engages over the glass 24, and that is secured to the base by screws 32. Secured in the plate 24 are pins or supports 34, which have rounded upper ends on which the lens blank B, which is to be marked, is seated for the marking operation.

A standard lamp bulb 40 (FIG. 1) is removably secured in the base in a socket 42. The socket 42 has an integral projecting arm 44 which is fastened by screws 46 to a plate 48 that closes the base 20 at its bottom. The light from this bulb is reflected by a mirror 50 upwardly through the opening 22, reticle plate 24 and the lens blank B which is supported on pins 34. The mirror is mounted within base 20 on an angular bracket 52 so that it will be held at an angle of 45° to the horizontal. This bracket 52 is secured by screws 54 on the bottom plate 48 of the base.

Mounted in the base 20 is a conventional transformer 58, and a switch 60 (FIG. 3) for flipping the bulb 40 on and off. The transformer is connected to the lamp to control the voltage supplied thereto. There is a grommet 62 in one side wall of the base through which the conduit 63 and the wires, that lead to and from the transformer, pass. A louvered plate 59, which covers an opening 61 in the base, permits ventilation of the base to carry off the heat produced by the lamp in operation.

Pivotally mounted upon the base by means of a hinge pin 64 (FIGS. 1 and 2) is a swinging frame or head 66. The pin 64 passes through ears 68 that are integral with the base 20 and that project upwardly therefrom, and through ears 70 that are integral with the frame or head 66. The hinge pin 64 is journaled in bushings 72 positioned in the ears 70.

A knob 78 (FIGS. 2), which is fixed to a screw 79 that is threadably rotatable in a nut 74 which is secured in one of the ears 68, can be threaded up to seat against an outside side surface of one of the ears 70 to lock the head in any position about the axis of the hinge pin.

Secured by a screw 80 (FIG. 1) to the upper face of the base 20 adjacent one end thereof is a cup 82 which is adapted to hold a sponge rubber and felt disc arrangement to which ink may be applied.

Mounted in the frame or head 66 to be disposed above the cup 82, when the head is in its down position, is a plunger 86 (FIG. 2) which is reciprocable in a sleeve 88 that is rotatably mounted in a bushing 90 which is carried in a slide 92 (FIG. 1) that is mounted for reciprocable adjustment on the frame or head 66. The plunger is held against rotation relative to the sleeve 88 by a pin 87 (FIGS. 1 and 2), which passes through the plunger and which engages at one end in a slot 89 formed in the bore of the sleeve 88 and extending in the direction of the axis of the sleeve. The sleeve 88 itself, after adjustment, is held against rotation by a pin 91 (FIG. 1), that projects at its inner end into a hole in the bushing 90 and that is pressed into and held in place by a screw having a knurled head 93 for rotating it. Screw 93 threads through a nut 95 that has a threaded fit in a recess in slide 92.

The plunger 86 is spring-pressed upwardly by a coil spring 94 (FIG. 2), that is interposed between a shoulder 96 formed by the enlarged upper end of the plunger, and a ring 98, which has a pressed fit in the bottom of the sleeve 88, and through which the smaller diameter portion of the plunger slides. Secured by a setscrew 100 to the lower end of the plunger is a collar 102 having an enlarged diameter flange portion at its lower end on which are pivotally mounded two arms 104 by means of pins 106. The arms 104 have their outer ends pivotally connected by means of pins 108 to spaced lugs or ears 110 formed at opposite ends of a flexible strap 112 which may be made of spring steel, spring brass, or the like. This strap is normally curved from end to end, as shown, and has a pin 114 secured to its upper concave face substantially at its center. Pin 114 extends upwardly and slides in a hole 116 in plunger 86.

The lower face of the strap 112 has secured thereto by glue, cement, or the like a marking strip 118 made of rubber or the like. It is this strip which marks the lens blank by transferring marking material from the cup 82 to the lens blank. In order to pick up marking material on the strip 118, the operator depresses the plunger 86 by pushing down on the knob 120, which is secured to the top of the plunger. This compresses the spring 94 and brings the marking strip 118 into engagement with the marking material 84 in the cup 82, transferring marking material to the strip. When released, the plunger moves upwardly to a limit position determined by the engagement of collar 102 with sleeve 88.

Figure 1:
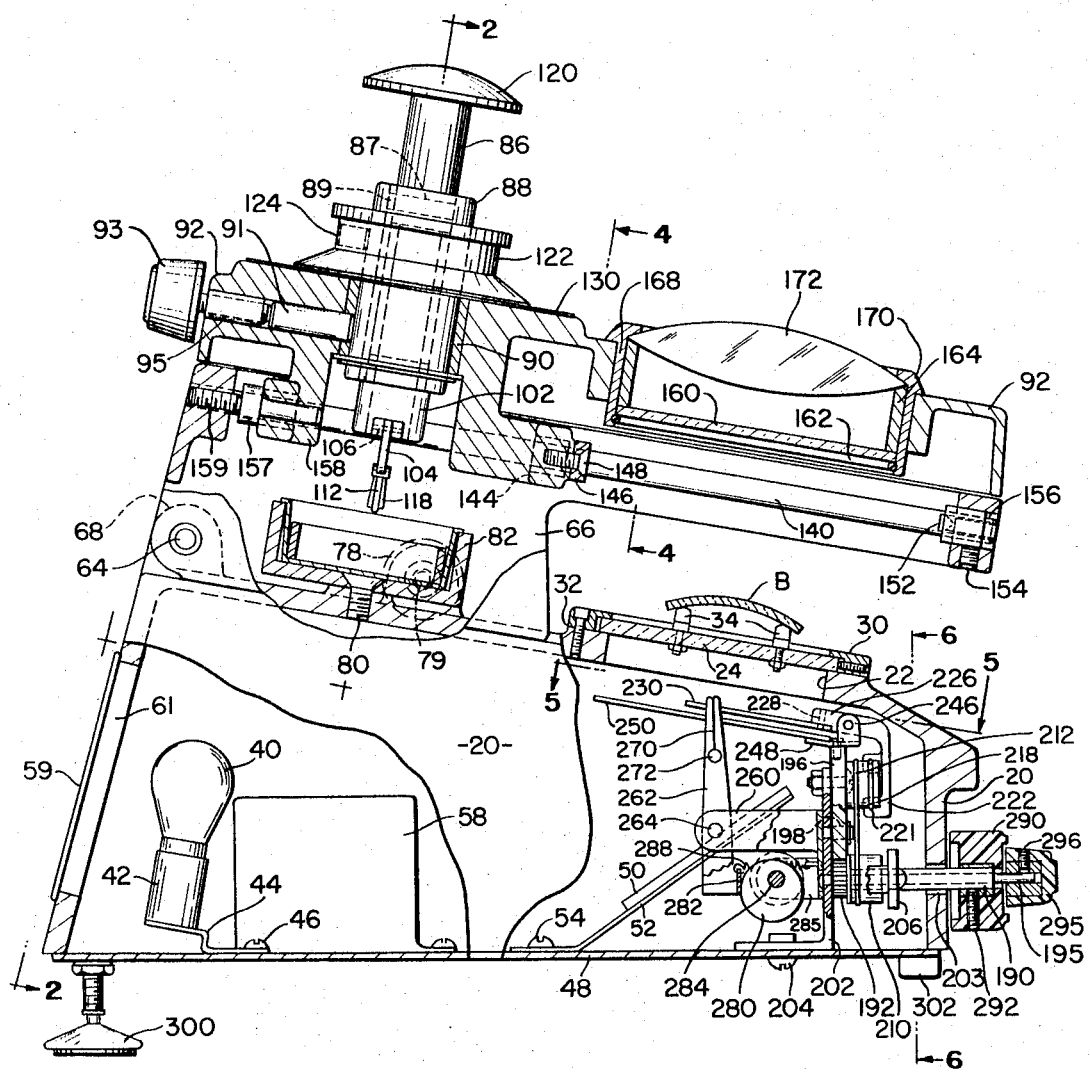
FIG. 1 is a side elevation, with parts broken away, of a lens marker built according to one embodiment of this invention.
Figure 2:
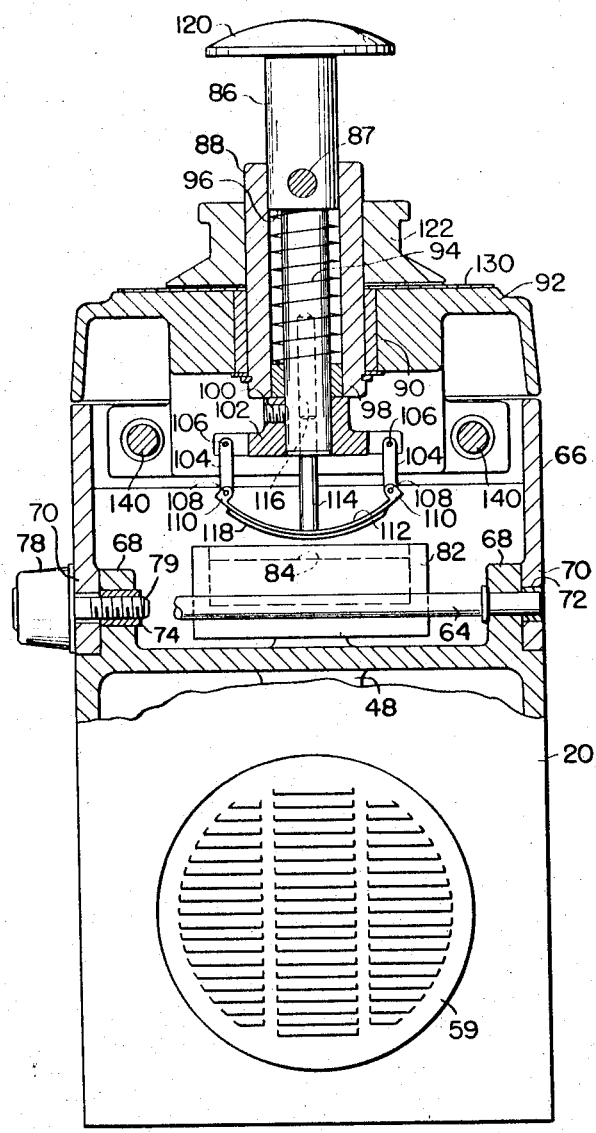
FIG. 2 is a part end view, part sectional view taken on the line 2—2 of FIG. 1 looking in the direction of the arrows.

The marking strip is adapted to be positioned at the required angle to mark the lens blank properly, by rotating the dial 122 after releasing pin 91 (FIG. 1). This dial is secured to the sleeve 88 by a setscrew 124. The dial has a index line 126 (FIG. 3) on it which reads against graduations 128 formed on a surrounding portion 130 of the upper surface of the slide 92.

The slide 92 is reciprocal on the swinging frame or head 66 to move the marking strip 118 (FIG. 1), after it has picked up the marking material from the well 82, into registry with the lens blank B which is to be marked, and to return the marking strip into registry with the well 82 after the marking operation has been completed. The slide 92 slides on two spaced parallel rods 140, each of which is secured at its opposite ends in the head 66.

To insure precise positioning of the marker over the lens a steel plate 146 (FIG. 1) is secured to the front face of a bridging portion 144 of slide 92 by screws 148. There is a nylon plug 150 (FIG. 4) secured in a recess in the front of the steel plate 146. A nylon button 152 (FIGS. 1 and 3) is secured in a recess in the overhanging front wall of the frame or head 66; and magnetic plugs 156 are fastened by setscrews 154 (FIG. 1) in recesses in this overhanging front wall that are disposed at opposite sides of button 152. The nylon plug 150 abuts against the nylon button 152 to cushion and stop the forward movement of slide 92 when the marker is moved to marking position; and the magnets 156 acting on the steel strap 146 pull the slide tight against the button 152 so that the slide will always be pulled up by magnetic force to the same precise marking position. This insures highest accuracy in marking lenses.

To cushion the return movement of the slide 92, a nylon plug 157 (FIG. 1) is secured in the rear face of the bridging portion 158 of slide 92. This plug is adapted to engage a registering stop 159 which is threadably adjustable in the rear wall of frame or head 66.

A spring strap 161 (FIG. 3) that engages against one side of the bridging portion 158 of slide 92 tends frictionally to hold the slide in its rear position with the marker over the ink well or cup 82.

A translucent ground glass screen 160 (FIG. 1) is secured in the carriage 92 between an O-ring 162 and plastic ring 164. O-ring 162 is seated in a groove in a flanged sleeve 168 that is seated by means of an external flange 170 in a circular opening that extends through carriage 92 to align with opening 22 in the base 20 of the apparatus. A magnifying lens 172 is mounted between the upper end of the ring 164 and an internal flange formed on the upper end of sleeve 168. This lens magnifies the images that are projected onto the screen 160.

Journaled in one end of base 20 is a hollow shaft 190 (FIG. 1). Journaled in this shaft 190 is a second shaft 195 to which is secured a pinion 192 (FIG. 6) that meshes with a rack 194 which is integral with the lower end of a slide 196. Slide 196 slides, within the limits allowed by pins 198, on the upright portion of a right-angular bracket 202 (FIGS. 1 and 6). Pins 198 are secured in the upright portion of bracket 202 and pass through slots 200 of the slide and are secured at their outer ends in a plate or strap 205 that holds slide 196 on bracket 202. Bracket 202 is fastened to base 20 by screws 204. Hollow shaft 190 is journaled in bushing 203 (FIG. 1) in base 20 and in outboard supporting strap 206 (FIG. 5) which is supported from the upright portion of bracket 202, by studs 207 that carry spacers 208.

Integral with or fastened to hollow shaft 190 is a drive pulley 210 which drives spaced parallel pulleys 218 and 220 through an endless belt 212 which passes over all three pulleys. Pulleys 218 and 220 are journaled on studs 217 and 219 that are fastened in slide 196.

The pulleys 18 and 220 have two tracks or grooves, each; and an endless belt 221 operates in the second grooves of these two pulleys and is driven by them.

Figure 5:
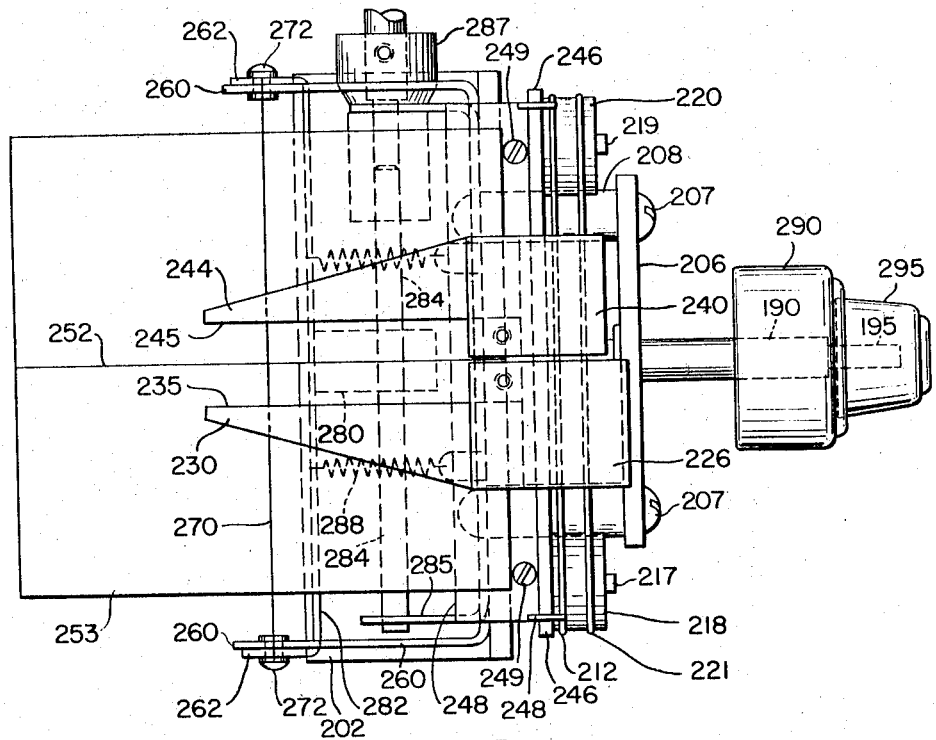
FIG. 5 is a sectional view approximately on the line 5—5 of FIG. 1, looking in the direction of the arrows.
Figure 6:
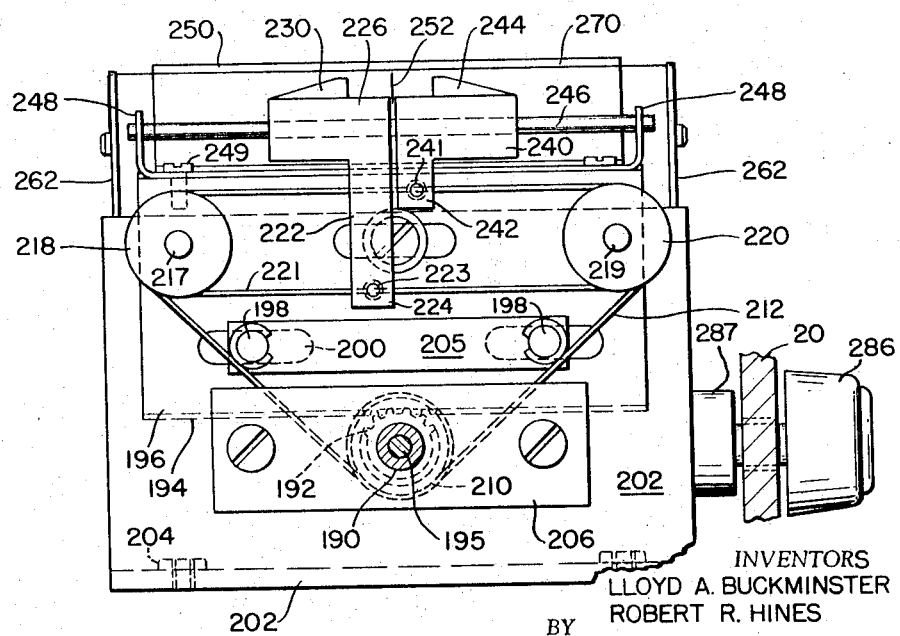
FIG. 6 is an end view of the parts shown in FIG. 5 taken approximately on the line 6—6 of FIG. 1 looking in the direction of the arrows.

Secured to the lower reach of the belt 221 by a pin 223 is an obtuse angular bracket 222 to whose upper leg 226 there is fastened a transparent plastic strip 230 (FIGS. 1, 5 and 6). Secured to the upper reach of the belt 221 by a pin 241 is an obtuse angular bracket 240 to whose upper leg there is fastened a second transparent plastic strip 244.

Figure 7:
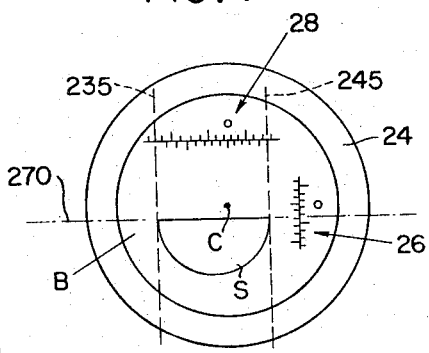
FIG. 7 is a diagrammatic view illustrating how the device may be used in laying out a lens for marking.

The strips 230 and 244 are of general triangular shape in plan and have parallel straight confronting side edges 235 and 245, respectively, (FIG. 5) which between them are intended to define the width of the segment portion S of the lens blank (FIG. 7). By rotating the pulleys 218 and 220 in one direction, the distance between side edges 235 and 245 can be increased, and by rotating these pulleys in the opposite direction the distance between edges 235 and 245 can be decreased. Thus the spacing of edges 235 and 245 can be defined in accordance with the desired width of segment S (FIG. 7).

The brackets 230 and 244 are mounted on a rod 246 to slide with slide 196. Rod 246 is fixed at its opposite ends in a generally U-shaped support 248 which is secured to slide 196 by screws 249. Thus the strips 230 and 244 move with slide 196 to shift them laterally in accordance with the desired position of the segment S (FIG. 7) laterally of the lens bank.

The shaft 190 can be rotated to rotate pulleys 210, 218, 220, in either direction by rotation in either direction of knurled knob 290 (FIG. 1) which is secured to shaft 190 by a set screw 292. The shaft 195 (FIGS. 1 and 6) can be rotated to rotate pinion 192 and shift slide 196 laterally by rotating knurled knob 295 which is secured to shaft 195 by set-screw 296.

Disposed beneath the strips 230 and 244 is a transparent plate 250 (FIGS. 1 and 5) which is supported on a forwardly projecting arm of bracket 248. The plate 250 has a center line 252 inscribed thereon which reads against the graduations 28 (FIG. 3) so that the slide 196 can be adjusted precisely in accordance with the desired off-center position of the reading segment S (FIG. 7) of the lens.

Fastened to the upright portion of bracket 202 (FIG. 1) is a U-shaped bracket 260 whose parallel legs extend rearwardly. Pivotally mounted on the legs of bracket 260 is another U-shaped bracket 262 between whose parallel legs there is fastened a nylon or similar cord 270 (FIG. 5). This cord is held taut by means of the screws 272 which fasten its ends to the legs of bracket 262.

The bight portion 282 of bracket 262 engages the periphery of an eccentric 280 (FIG. 1) which is secured to a shaft 284 that is journaled at one end in a U-shaped bracket 285 that is fastened by screws 207 to the upright portions of bracket 202. A knurled knob 286 (FIG. 6) is secured by a coupling 287 to shaft 284 to rotate this shaft manually to rock arms 262 and cord 270 (FIG. 1) about the axis of shaft 264, thereby to position cord 270 in accordance with the desired position of the upper edge of the segment portion S (FIG. 7) of the lens blank.

Coil springs 288 (FIGS. 1 and 5) hold the bight portion 282 of bracket 262 constantly in engagement with eccentric 280.

In use, the operator, while peering through the lens 172, adjusts the slide 196 by rotation of knob 295 to shift the plate 250 laterally in accordance with the desired lateral position of the reading segment S right or left of the center C of the lens, reading the setting against the graduations 28; and he adjusts the position of cord 270 by rotating knob 286 (FIG. 6) in accordance with the prescribed distance of the top line of the reading segment S above or below the optical center of the lens blank, reading the setting against graduations 26 (FIG. 7). The tilting adjustment of cord 270 about pivot 264 shifts the cord forward or back depending upon the direction of rotation of knob 286. The light 40, of course, can be turned on to assist in positioning the various parts.

In order to provide the required cylindrical axis marking upon the finished surface of the lens blank so as to be able to finish the other side of the lens blank to correspond to the predetermined position of the reading segment, the marking strip holder 88 (FIG. 1) is rotatably adjusted by rotation of dial 122 to bring the index mark 126 (FIG. 3) against the required graduation on scale 128.

After the above adjustments have been made the lens blank B is placed on the pins 34 (FIG. 1). With the apparatus shown, the image of the lens blank B (FIG. 7), which is to be marked, is projected onto the screen 160 (FIG. 1), so that the position of segment S (FIG. 7) can be observed through the screen in relation to the positions of the straight edges 235 and 245 and to the position of cord 270. Then by adjusting the lens blank manually relative to the previously adjusted positions of the settings on graduations 26 and 28, and at the same time rotating knob 290 so as to adjust strips 230 and 244 to center the segment S between them, the lens blank can be adjusted to the desired position for marking it.

Figure 4:
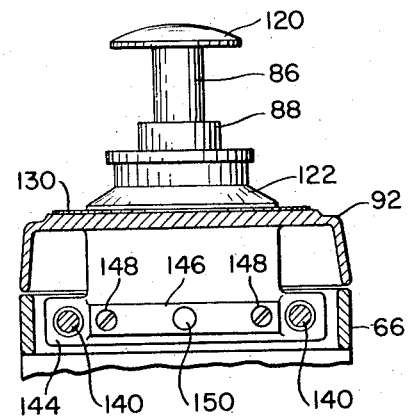
FIG. 4 is a fragmentary section taken approximately on the line 4—4 of FIG. 1, looking in the direction of the arrows.

Then the plunger 86 (FIG. 2) is depressed by pushing down on knob 120 so that the marking strip will pick up ink from the cup or well 82. The plunger is then released; and the slide 92 is moved forward manually to bring the marking strip over the lens blank, a position determined by abutment of nylon plug 150 (FIG. 4) against nylon button 152, and by magnets 156. This is accomplished simply by pulling the slide forward on the parallel guide rods 140 (FIGS. 1 and 4). Then the plunger 86 is depressed again to cause the marking strip to mark the lens blank.

The slide 92 can be returned to its left hand position as viewed in FIG. 1. Stop 159 (FIG. 1) cooperating with nylon plug 157 will cushion the return movement. Spring strap 161 (FIG. 3) will hold the slide frictionally in its returned position.

While the segment S shown in FIG. 6 has a straight upper edge, it will be understood that the device described may be used for marking segments having curved upper edges also merely by positioning the upper edge of the segment in tangency with the cord 270.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. Apparatus for marking a lens blank which has a reading segment therein, comprising
   (a) means for supporting a lens blank,
   (b) first adjustable transparent means disposed at one side of said supporting means for defining the width of the segment,
   (c) second and third adjustable means for defining the location of the segment in two directions at right angles to one another so as to define the position of the segment relative to the center of the lens blank,
   (d) a transparent member disposed at the same side of said supporting means as said defining means and having two sets of graduations disposed at right angles to one another by which to adjust said defining means,
   (e) a translucent image-receiving screen disposed at the opposite side of said supporting means, and
   (f) means for projecting onto said screen superimposed images of said defining means, said graduations, and a lens blank disposed on said supporting means,
   (g) said second and third means projecting onto said screen the images of a pair of intersecting lines, one of which interesects at right angles the image of one of said sets of graduations, and the other of which interesects at right angles the image of the other of said sets,
   (h) the lens blank being manually adjustable on said supporting means to locate its reading segment in accordance with the images of said defining means.

2. Apparatus as claimed in claim 1, wherein said first adjustable defining means comprises
   (a) a pair of transparent members having spaced edges adapted to define therebetween the desired width of the segment,
   (b) means for adjusting the two members of said pair relative to one another to adjust said edges toward and away from one another,
   (c) one of said second and third means comprising a cord extending parallel to said one set of graduations, (d) the other of said second and third means comprising a transparent plate having thereon a line which extends parallel to said other set of graduations, (e) means for tiltably adjusting said cord about an axis parallel to said cord, and (f) means for adjusting said transparent plate at right angles to said line.

3. Apparatus as defined in claim 1, wherein said first adjustable defining means comprises (a) two transparent members having parallel straight edges, and (b) means for adjusting said two members relative to one another to adjust their straight edges toward and away from one another, (c) one of said second and third adjustable defining means comprises (1) a cord, (2) means for supporting said cord to extend at right angles to said straight edges, and (3) means for tiltably adjusting said cord-supporting means about an axis extending parallel to said cord, (d) the other of said second and third adjustable defining means comprises (1) a transparent plate having a line inscribed thereon which extends parallel to said straight edges, and (2) means for adjusting said plate in the direction of said axis, and (e) said graduated transparent member is disposed between all of said defining means and said supporting means.

4. Apparatus for marking a lens blank which has a reading segment therein, comprising (a) means for supporting a lens blank, (b) first adjustable transparent means disposed at one side of said supporting means for defining the width of the segment, (c) second and third adjustable means for defining the location of the segment in two directions at right angles to one another so as to define the position of the segment relative to the center of the lens blank, (d) a transparent member disposed at the same side of said supporting means as said defining means and having two sets of graduations disposed at right angles to one another by which to adjust said defining means, (e) a translucent image-receiving screen disposed at the opposite side of said supporting means, (f) said first adjustable defining means comprising two transparent members having parallel straight edges, and (g) means for adjusting said two members relative to one another to adjust their straight edges toward and away from one another, (h) one of said second and third adjustable defining means comprising (1) a cord, (2) means for supporting said cord to extend at right angles to said straight edges, and (3) means for tiltably adjusting said cord-supporting means about an axis extending parallel to said cord, (i) the other of said second and third adjustable defining means comprising (1) a transparent plate having a line inscribed thereon which extends parallel to said straight edges, and (2) means for adjusting said plate in the direction of said axis, and (j) said graduated transparent member being disposed between all of said defining means and said supporting means, (k) the means for adjusting the two transparent members of said pair comprising (1) an endless belt, (2) one of said pair being secured to the upper reach of said belt and the other of said pair being secured to the lower reach thereof, and (3) means for selectively moving the belt in opposite directions, (l) said transparent plate being disposed in proximity and parallel to the plane of movement of said pair, and (m) the means for adjusting said plate comprising a slide on which said plate is mounted and (n) means for adjusting said slide in the direction of said axis, (o) the means for driving said belt and for adjusting said slide being two coaxial shafts mounted one within the other.

5. Apparatus for making a lens blank which has a reading segment therein, comprising (a) means for supporting a lens blank including a reticle having two sets of graduations thereon extending at right angles to one another, (b) transparent means readable against one set of said graduations for defining the width of the reading segments, (c) transparent means readable against the other set of graduations for defining the position of the top edge of the reading segment, (d) mounting means for adjustably supporting both said defining means beneath said supporting means and beneath a lens blank supported thereby, (e) means for adjusting the first-named defining means laterally to adjust said first-named defining means in accordance with the location of the reading segment with reference to the center of the lens blank, (f) a marking element, (g) a translucent image-receiving screen, (h) means for moving said marking element and said screen selectively into alignment with said supporting means and said defining means above both, and (i) means for directing light through said defining means, said reticle, and the lens blank onto said screen when said screen is disposed above said supporting means.

6. Apparatus for marking a lens blank which has a reading segment therein, comprising (a) a base, (b) means on said base for supporting a lens blank, (c) transparent means for defining the width of the reading segment and its location relative to the center of the blank, (d) means for defining the position of the top edge of the reading segment, (e) a reticle graduated to permit precise adjustment of both said defining means, (f) a container for marking compound carried by said base, (g) a marking element, (h) a carriage rectilinearly slidable on said base to move said marking element from a position of registry with said container to a position of registry with said supporting means, (i) means for mounting said marking element for movement toward and away from said container and said supporting means, respectively, when in registry with either, respectively, and (j) a head hingedly mounted on said base for movement toward and away from said base, said carriage being slidable on said head, and (k) a translucent image-receiving screen, (l) said screen being mounted on said carriage, and (m) the sliding movement of said carriage moving said screen and said marking element selectively into registry with said supporting means when said head is in its down position.
7. Apparatus as claimed in claim 6, wherein
(a) said defining means are disposed on said base beneath said reticle, said reticle is also mounted on said base, and
(c) said reticle is between said defining means and said supporting means.

References Cited
UNITED STATES PATENTS

| | | | |
|---|---|---|---|
| 2,146,599 | 2/1939 | Smith | 33—174 |
| 2,755,553 | 7/1956 | Vaughan | 33—174 X |
| 2,917,971 | 12/1959 | Goddu et al. | 33—174 X |
| 3,242,581 | 3/1966 | Wagener | 33—174 |

SAMUEL S. MATTHEWS, *Primary Examiner.*